(12) United States Patent
Huang (10) Patent No.: US 11,973,503 B2
(45) Date of Patent: Apr. 30, 2024

(54) APPLICATION SPECIFIC INTEGRATED CIRCUIT (ASIC) CHIP, AND SENSOR AND ELECTRIC TOOTHBRUSH USING SAME

(71) Applicant: Nanjing Prime Semiconductor Co., Ltd., Nanjing (CN)

(72) Inventor: Sunfeng Huang, Nanjing (CN)

(73) Assignee: NANJING PRIME SEMICONDUCTOR CO., LTD., Nanjing (CN)

( * ) Notice: Subject to any disclaimer, the term of this patent is extended or adjusted under 35 U.S.C. 154(b) by 0 days.

(21) Appl. No.: 18/277,098

(22) PCT Filed: Sep. 29, 2022

(86) PCT No.: PCT/CN2022/122754
§ 371 (c)(1),
(2) Date: Aug. 14, 2023

(65) Prior Publication Data
US 2024/0080021 A1 Mar. 7, 2024

(30) Foreign Application Priority Data

Sep. 5, 2022 (CN) .......................... 202211075505.5

(51) Int. Cl.
*H03K 5/133* (2014.01)
*B81B 7/00* (2006.01)

(52) U.S. Cl.
CPC ........... *H03K 5/133* (2013.01); *B81B 7/0048* (2013.01); *B81B 2201/0264* (2013.01); *B81B 2207/03* (2013.01)

(58) Field of Classification Search
CPC .. H03K 5/133; B81B 7/0048; B81B 2207/03; B81B 2201/0264
See application file for complete search history.

(56) References Cited

U.S. PATENT DOCUMENTS

| 8,823,388 | B2 * | 9/2014 | Lin | .......................... | H03H 7/32 |
| | | | | | 324/76.54 |
| 2007/0005285 | A1 * | 1/2007 | Owens | ............. | G01R 31/31725 |
| | | | | | 702/118 |

(Continued)

FOREIGN PATENT DOCUMENTS

| CN | 108309486 A | 7/2018 |
| CN | 109738109 A | 5/2019 |
| CN | 114207399 A | 3/2022 |

*Primary Examiner* — Omar F Mojaddedi
(74) *Attorney, Agent, or Firm* — Bayramoglu Law Offices LLC (57) ABSTRACT

An application specific integrated circuit (ASIC) chip is provided. Stress in various directions can be measured by disposing symmetrical "four-corner+middle" delay chain combinations in three dimensions inside the ASIC chip. Two sensors using the ASIC chip are further provided. In one sensor, a micro-electromechanical system (MEMS) chip is stacked with the ASIC chip. In the other sensor, the MEMS chip and the ASIC chip are symmetrically arranged. After being stacked and symmetrically arranged, the MEMS chip and the ASIC chip have highly consistent stress concentration characteristics, which can calibrate stress in various directions and effectively improve accuracy and temperature stability of the MEMS chip. In addition, an electric toothbrush using the ASIC chip is further provided, which can effectively improve consistency, stability, reliability, sensitivity, and linearity of stress detection, and can more accurately compensate for a temperature drift.

17 Claims, 8 Drawing Sheets

(56) References Cited

U.S. PATENT DOCUMENTS

| | | | |
|---|---|---|---|
| 2009/0064791 A1* | 3/2009 | Ueda | G01L 1/16 |
| | | | 73/777 |
| 2010/0171530 A1* | 7/2010 | Deppe | H03L 7/18 |
| | | | 327/102 |
| 2022/0260437 A1* | 8/2022 | Bahnmüller | G01B 7/18 |

* cited by examiner

APPLICATION SPECIFIC INTEGRATED CIRCUIT (ASIC) CHIP, AND SENSOR AND ELECTRIC TOOTHBRUSH USING SAME

CROSS REFERENCE TO THE RELATED APPLICATIONS

This application is the national phase entry of International Application No. PCT/CN2022/122754, filed on Sep. 29, 2022, which is based upon and claims priority to Chinese Patent Application No. 202211075505.5, filed on Sep. 5, 2022, the entire contents of which are incorporated herein by reference.

TECHNICAL FIELD

The present disclosure relates to the field of stress measurement and calibration devices and equipment, and in particular, to an application specific integrated circuit (ASIC) chip, and a sensor and an electric toothbrush using same.

BACKGROUND

A conventional ASIC chip uses an analog-to-digital converter, and its internal circuit cannot be quantified due to deformation, making it impossible to measure stress.

Compared with other conventional integrated circuit products, a micro-electromechanical system (MEMS) device requires that its packaging needs to follow some additional design constraints and meets requirements of working in a harsh environmental condition, resulting in relatively high complexity. Regardless of a packaging material and process that are used, thermal stress and mechanical stress have a significant impact on reliability and repeatability of the vast majority of MEMS devices. A difference between thermal expansion coefficients of MEMS device packaging materials, and anisotropy of a single material itself can lead to stress concentration caused by a temperature change. A relationship between a strain generated by an MEMS device and a temperature is not monotonic. In other words, a temperature-strain curve cannot be fitted by using a function, which means that a temperature curve cannot be calibrated based on a calibration point, resulting in poor accuracy and temperature stability of the MEMS device.

An electric toothbrush makes a brush head vibrate at a high frequency through rapid rotation or swinging of a driving component, so as to improve a tooth cleaning effect. In addition, the rapid rotation or swinging of the driving component also bring inconveniences, such as toothpaste splashing caused by high-frequency vibration of the brush head, damage to a tooth surface, a gum, and an alveoli due to excessive vibration, and insufficient brushing force caused by a user's sluggishness. To resolve the above problems, it is necessary to introduce a suitable torque measurement scheme for the brush head, to determine, based on a torque value, whether the brush head has been pressed onto the tooth surface, whether excessive pressure is applied, whether insufficient pressure is applied, and so on. For this reason, the patent application CN 108309486A entitled as "Electric Toothbrush with Brush Head Pressure Detection Apparatus" provides a scheme for relatively disposing a stress triggering component and a stress detection component on an output shaft of a toothbrush. However, the stress detection component structurally includes a Wheatstone bridge. When the stress detection component is attached to a groove by using welding adhesive, the welding adhesive is prone to overflow. Resistance of a bridge resistor of the Wheatstone bridge is closely related to a proportion relationship between four bridge arms. Welding adhesive overflow will affect the proportion relationship between the four bridge arms, thereby affecting the resistance of the resistor, and ultimately affecting consistency, stability, reliability, sensitivity, and linearity of the stress detection component. In addition, although not mentioned in the patent application, it can be clearly concluded in theory that there is still a need for a backend analog-to-digital converter circuit. However, the stress detection component is separated from the backend analog-to-digital converter circuit, which is located in different temperature fields, therefore failing to accurately compensate for a temperature drift of the stress detection component.

SUMMARY

The present disclosure is intended to provide an ASIC chip capable of measuring stress, provide a sensor that uses an ASIC chip and can perform stress calibration, and provide an electric toothbrush that uses an ASIC chip and can improve consistency, stability, reliability, sensitivity, and linearity of stress detection and accurately compensate for a temperature drift.

In order to achieve the above objective, the present disclosure adopts following technical solutions:

The ASIC chip in the present disclosure includes a delay chain array, a resistor-capacitor (RC) circuit, and a microprocessor, where the microprocessor outputs a trigger signal to the RC circuit, the RC circuit outputs a first signal START and a second signal STOP to an input port of the delay chain array, the delay chain array outputs a time propagation signal to the microprocessor, and the microprocessor processes the time propagation signal to output a digital signal; and the delay chain array includes a plurality of delay chains, where inside the ASIC chip, a "four-corner+middle" delay chain combination is arranged on at least one plane parallel to one side of the ASIC chip, a "four-corner+middle" delay chain combination is arranged on at least one plane parallel to the other side of the ASIC chip, and a "four-corner+middle" delay chain combination is arranged on at least one plane parallel to a bottom surface of the ASIC chip; the two sides of the ASIC chip are perpendicular to each other; and the "four-corner+middle" delay chain combination includes delay chains disposed at four corners of a plane and a delay chain disposed at a center of the plane, where the delay chain disposed at the center of the plane is located in another plane that intersects with the plane at a certain angle.

Further, the delay chains at the four corners of the plane each are any one of a 90° delay chain, a cross-shaped delay chains, and a square delay chain, and the delay chain at the center of the plane is any one of the 90° delay chain, the cross-shaped delay chain, the square delay chain, and a concircularly distributed delay chain;

the 90° delay chain includes two 90°-arranged delay chain units;

the cross-shaped delay chain includes four delay chain units that form four branches of a "cross-shaped" structure, where each of the four delay chain units is located on one branch of the "cross-shaped" structure, and the delay chains are perpendicular to the next ones clock or counter-clock wise;

the square delay chain includes four delay chain units that form four sides of a "square" structure, where each of the four delay chain units is located on one side of the "square" structure, and the delay chains are perpendicular to the next ones clock or counter-clock wise; and the concircularly distributed delay chain includes a plurality of delay chain units arranged on an arc, with two adjacent ones of the plurality of delay chain units arranged at a certain angle.

Further, the delay chain unit is any one of a cursor delay chain unit, a tap delay chain unit, and a differential delay chain unit.

The sensor using an ASIC chip in the present disclosure includes a substrate and an MEMS chip, where the sensor further includes the ASIC chip, the ASIC chip is fixed on the substrate, and the MEMS chip is stacked on a top of the ASIC chip.

Further, the MEMS chip and the ASIC chip are attached through gluing or bonding; and when the MEMS chip and the ASIC chip are attached through gluing, a thickness of adhesive is less than or equal to 0.5 μm. When the thickness of the adhesive is less than or equal to 0.5 μm, the MEMS chip and the ASIC chip have highly consistent stress concentration characteristics.

Further, the MEMS chip is coaxially stacked with the ASIC chip. In this way, the MEMS chip and the ASIC chip have the highly consistent stress concentration characteristics.

The sensor using an ASIC chip in the present disclosure includes a substrate and an MEMS chip, where the sensor further includes the ASIC chip, both the MEMS chip and the ASIC chip are fixed on the substrate, a center point of the MEMS chip, a center point of the ASIC chip and a center point of the substrate are on a plane parallel to one side of the substrate, a distance from the center point of the MEMS chip to an intermediate plane of the substrate is equal to a distance from the center point of the ASIC chip to the intermediate plane of the substrate, the intermediate plane is an intermediate plane parallel to the other side of the substrate, and the two sides of the substrate are perpendicular to each other.

Further, both the MEMS chip and the ASIC chip are fixed on the substrate through gluing or bonding; and when the MEMS chip and the ASIC chip are fixed on the substrate through gluing, an adhesive thickness of the MEMS chip is consistent with an adhesive thickness of the ASIC chip. When the adhesive thickness of the MEMS chip is consistent with the adhesive thickness of the ASIC chip, there is a high correlation between stress on the MEMS chip and the ASIC chip.

The electric toothbrush using an ASIC chip in the present disclosure includes a brush handle and a brush head, where a driving component is disposed in the brush handle, and an output shaft of the driving component is connected to the brush head; and the electric toothbrush further includes the ASIC chip, the ASIC chip is disposed on the output shaft, the output shaft is further provided with a stress triggering component, and the ASIC chip is configured to detect stress at a position of the stress triggering component.

Further, the stress triggering component is a groove disposed on a surface of the output shaft, and the ASIC chip is disposed inside the groove.

Further, the groove has any one of a rectangular cross section, a triangular cross section, and an L-shaped cross section.

Compared with the prior art, the present disclosure has following beneficial effects:

1. The present disclosure provides an ASIC chip. Stress in various directions can be measured by disposing symmetrical "four-corner+middle" delay chain combinations in three dimensions inside the ASIC chip.
2. The present disclosure provides two sensors using an ASIC chip. In one sensor, an MEMS chip is stacked with the ASIC chip. In the other sensor, the MEMS chip and the ASIC chip are symmetrically arranged. After being stacked and symmetrically arranged, the MEMS chip and the ASIC chip have highly consistent stress concentration characteristics, which can calibrate stress in various directions and effectively improve accuracy and temperature stability of the MEMS chip.
3. The present disclosure further provides an electric toothbrush using an ASIC chip. The electric toothbrush adopts a self-designed ASIC chip instead of a Wheatstone bridge whose resistance is easily to be affected by overflow of welding adhesive, and therefore, can effectively improve consistency, stability, reliability, sensitivity, and linearity of stress detection. In addition, since the ASIC chip itself can achieve analog-to-digital conversion without an additional analog-to-digital conversion circuit, the entire ASIC chip is located in a single temperature field, and can more accurately compensate for a temperature drift.

DETAILED DESCRIPTION OF THE EMBODIMENTS

The technical solutions of the present disclosure will be further described in detail below with reference to the embodiments and the accompanying drawings.

Figure 10:
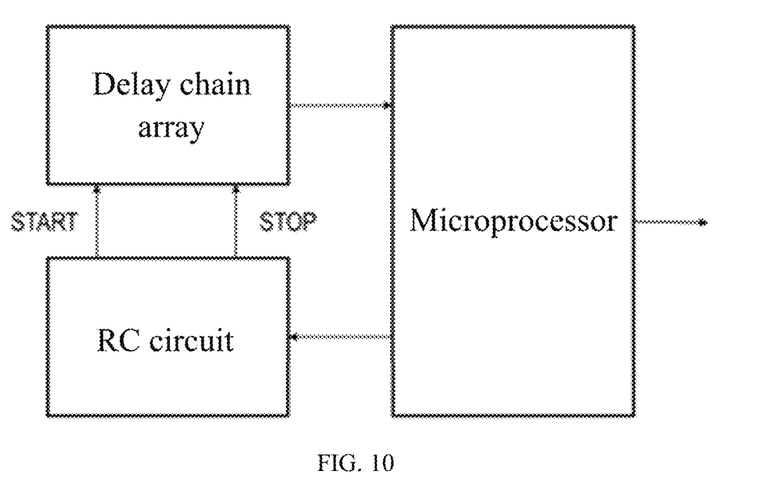
FIG. 10 is a diagram of a circuit module of an ASIC chip according to one embodiment of the present disclosure.

The embodiment discloses an ASIC chip. As shown in FIG. 10, a microprocessor outputs a trigger signal to an RC circuit, the RC circuit outputs a first signal START and a second signal STOP to an input port of a delay chain array, the delay chain array outputs a time propagation signal to the microprocessor, and the microprocessor processes the time propagation signal to output a digital signal.

The ASIC chip is in an overall shape of a rectangular cuboid. For the ASIC chip, a front side is parallel to a rear side, a left side is parallel to a right side, the front side is perpendicular to the left side, and a top surface is parallel to the ground. The delay chain array includes a plurality of delay chains. Inside the ASIC chip, a "four-corner+middle" delay chain combination is arranged on at least one plane parallel to the front side of the ASIC chip, a "four-corner+ middle" delay chain combination is arranged on at least one plane parallel to the left side of the ASIC chip, and a "four-corner+middle" delay chain combination is arranged on at least one plane parallel to a bottom surface of the ASIC chip. The "four-corner+middle" delay chain combination includes delay chains disposed at four corners of a plane and a delay chain disposed at a center of the plane, where the delay chain disposed at the center of the plane is located in another plane that intersects with the plane at a certain angle.

The delay chains at the four corners of the plane each are any one of a 90° delay chain, a cross-shaped delay chains, and a square delay chain, and the delay chain at the center of the plane is any one of the 90° delay chain, the cross-shaped delay chain, the square delay chain, and a concircularly distributed delay chain.

Figure 5:
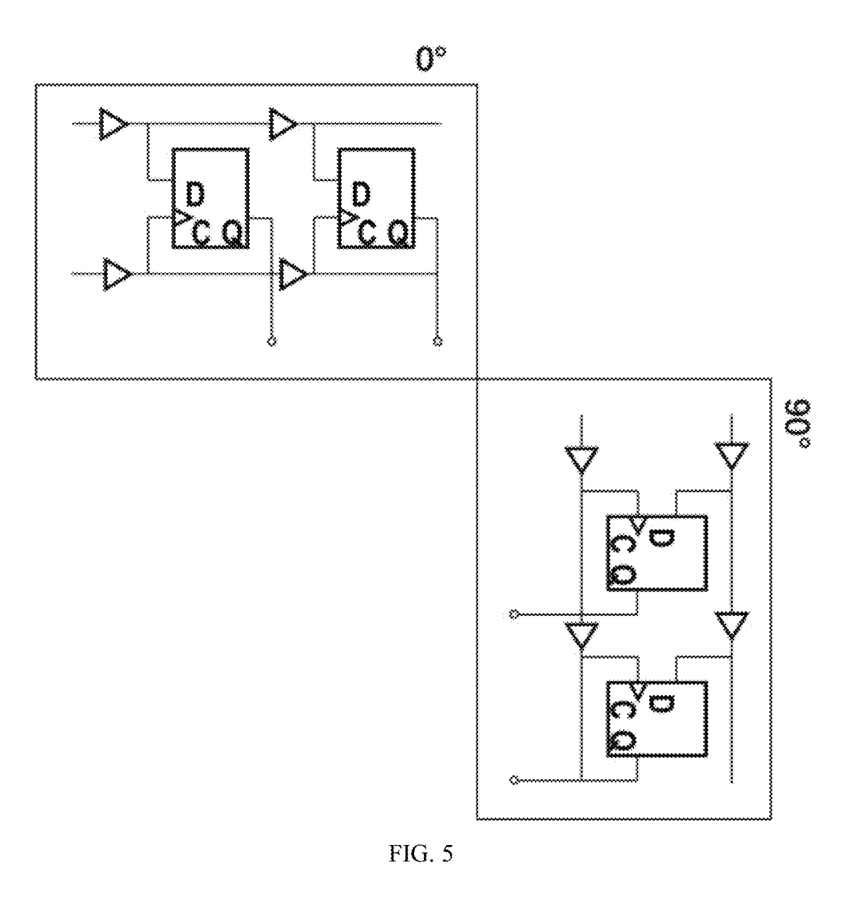
FIG. 5 is a schematic diagram of a 90° delay chain according to a specific implementation of the present disclosure.

Structures of the 90° delay chain, the cross-shaped delay chain, the square delay chain, and the concircularly distributed delay chain are described as follows:

The 90° delay chain includes two 90°-arranged delay chain units, as shown in FIG. 5.

Figure 6:
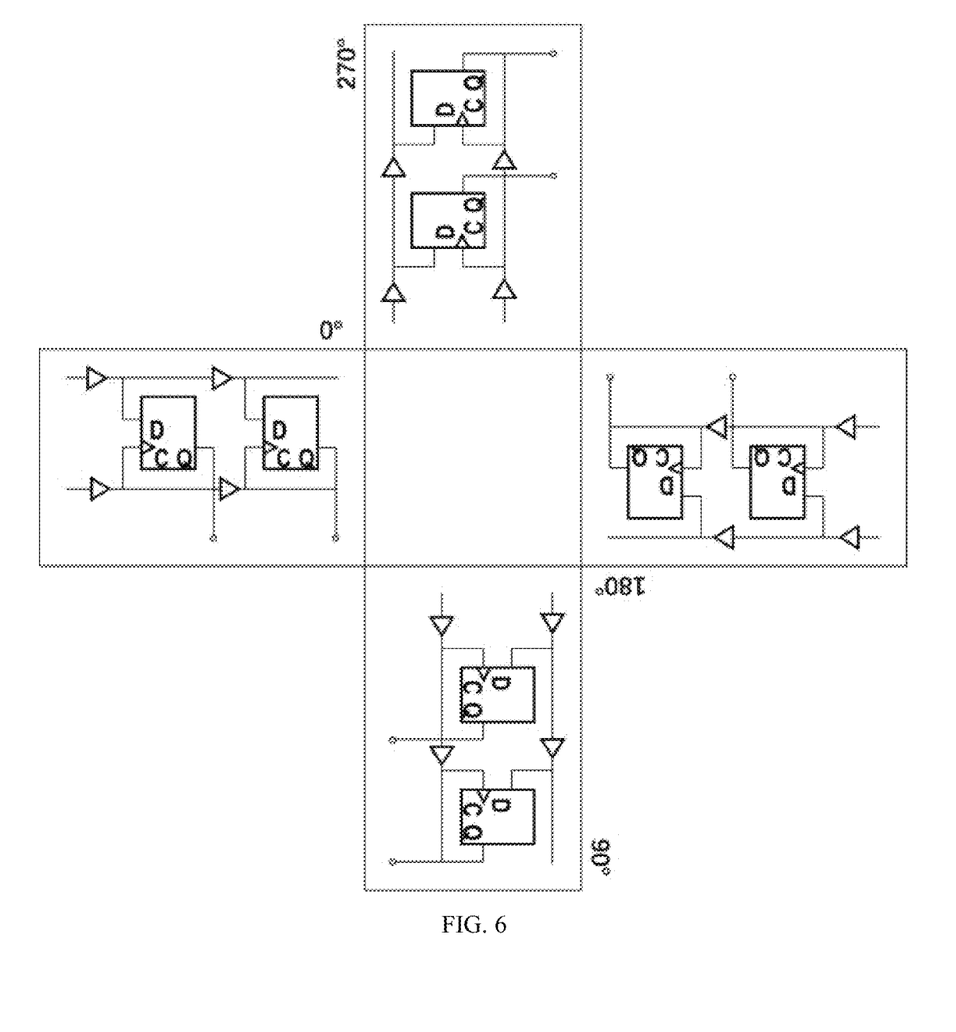
FIG. 6 is a schematic diagram of a cross-shaped delay chain according to one embodiment of the present disclosure.

The cross-shaped delay chain includes four delay chain units that form four branches of a "cross-shaped" structure, where each of the four delay chain units is located on one branch of the "cross-shaped" structure, and the delay chains are perpendicular to the next ones clock or counter-clock wise, as shown in FIG. 6.

Figure 7:
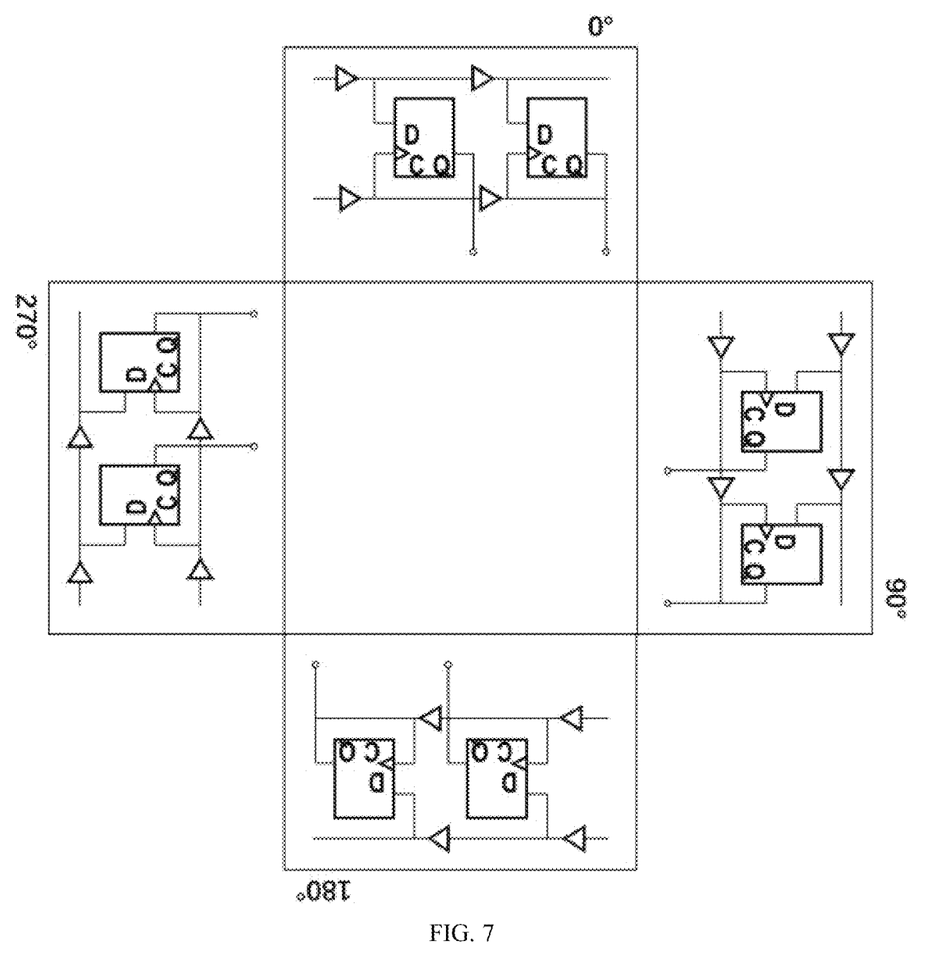
FIG. 7 is a schematic diagram of a square delay chain according to one embodiment of the present disclosure.

The square delay chain includes four delay chain units that form four sides of a "square" structure, wherein each of the four delay chain units is located on one side of the "square" structure, and the delay chains are perpendicular to the next ones clock or counter-clock wise, as shown in FIG. 7.

Figure 8:
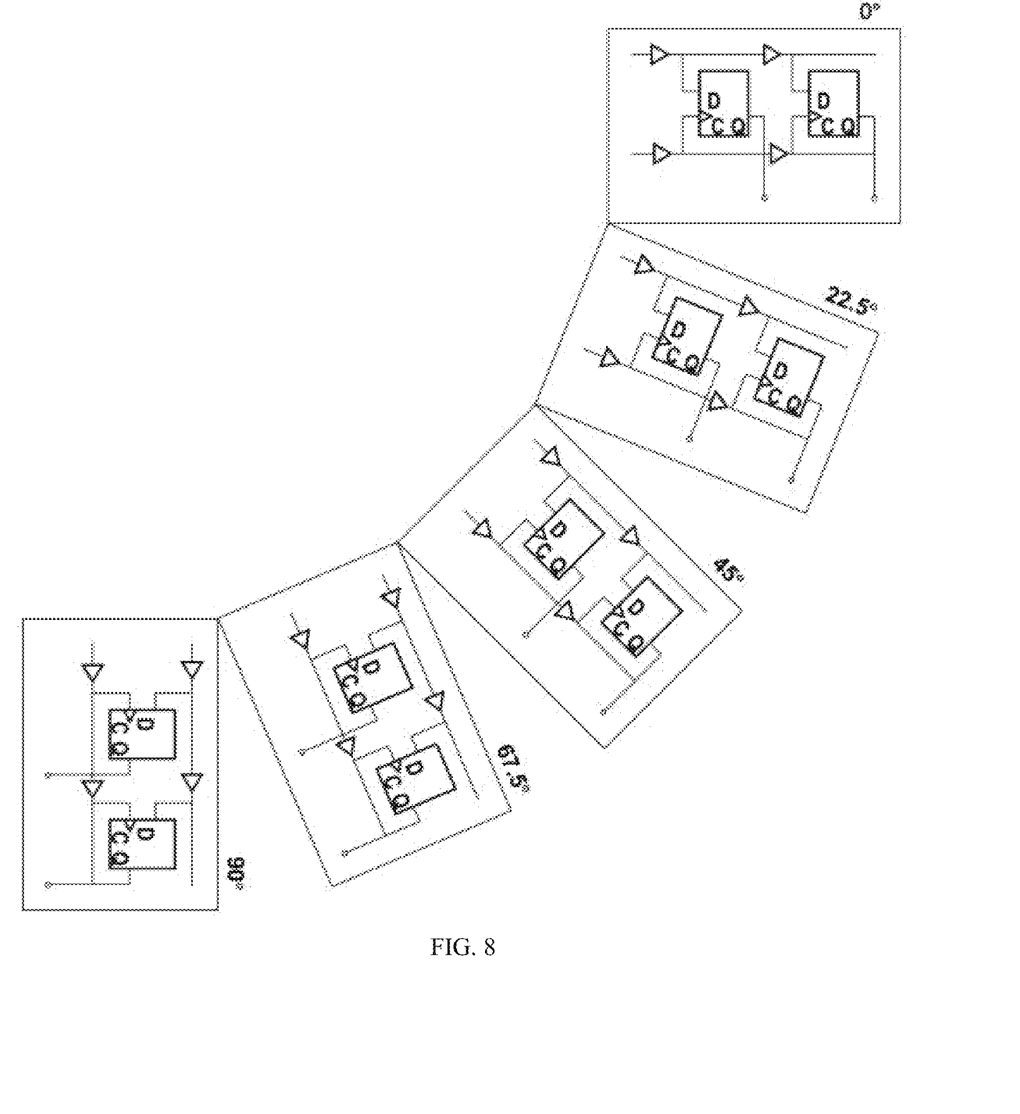
FIG. 8 is a schematic diagram of a concircularly distributed delay chain according to one embodiment of the present disclosure.

The concircularly distributed delay chain includes a plurality of delay chain units arranged on an arc, with two adjacent ones of the plurality of delay chain units arranged at a certain angle. The angle multiplied by a quantity of delay chain units equals 360°, and the quantity of delay chain units should be greater than or equal to 3. As shown in FIG. 8, there is an angle of 22.5° between two adjacent delay chain units. There are 16 delay chain units, but only five of them are shown in FIG. 8.

Figure 4:
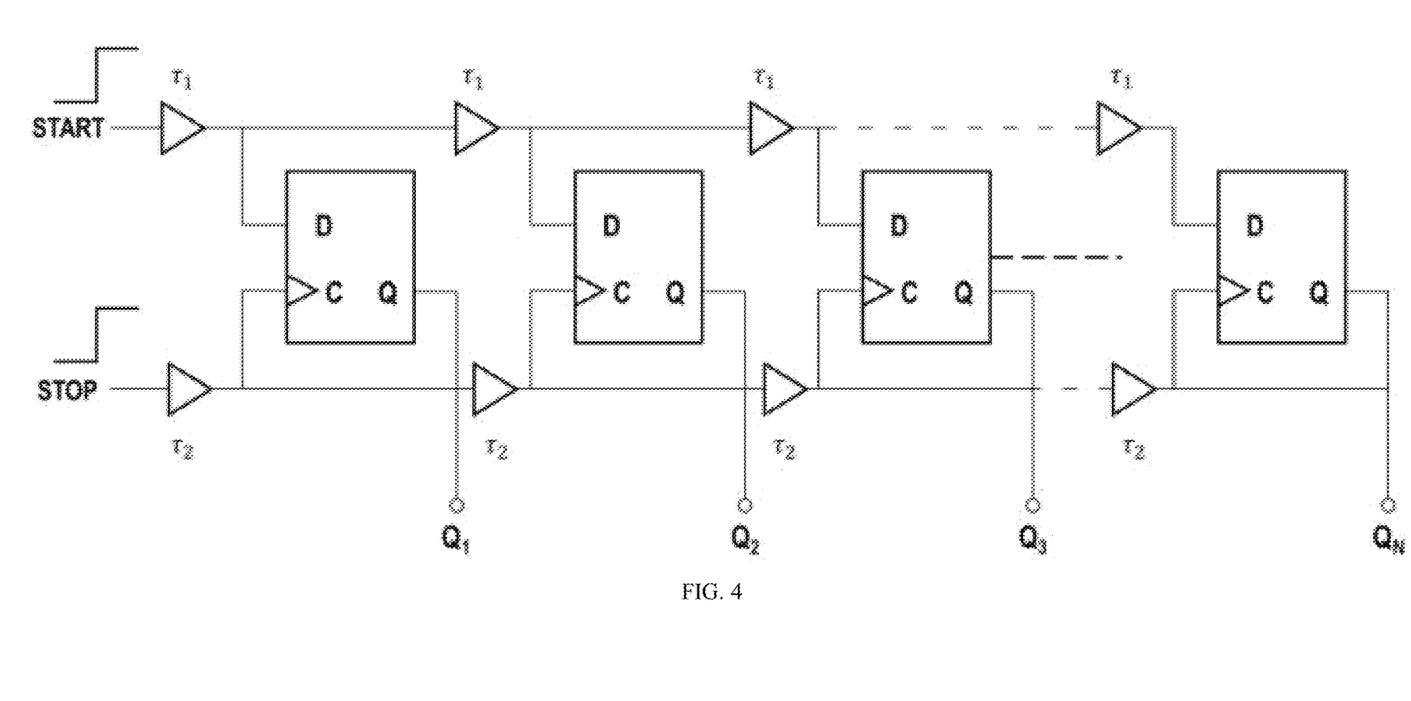
FIG. 4 is a schematic diagram of a differential delay chain according one embodiment of the present disclosure.
Figure 9:
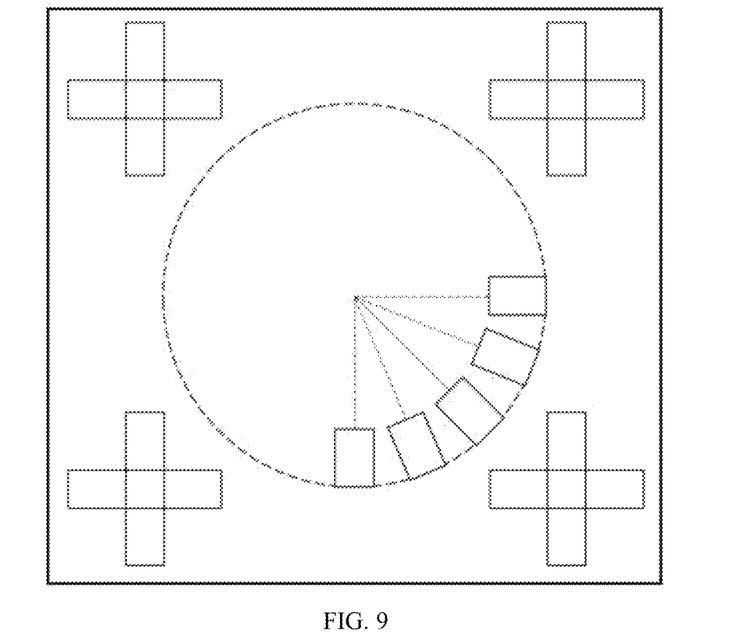
FIG. 9 is a schematic diagram of a "four-corner+middle" arrangement according to one embodiment of the present disclosure.

The delay chain unit is any one of a cursor delay chain unit, a tap delay chain unit, and a differential delay chain unit. The differential delay chain unit is shown in FIG. 4. A "four-corner+middle" delay chain combination is shown in FIG. 9. Delay chains on four corners of a plane are the 90° delay chains, and a delay chain at a center of the plane are the concircularly distributed delay chain.

The embodiments further provide two sensors capable of stress calibration. The two sensors both include a MEMS chip 1, an ASIC chip 2, and a substrate 3. However, relative position of the MEMS chip 1 and the ASIC chip 2 in the two sensors are different. In one sensor, the MEMS chip 1 is stacked with the ASIC chip 2, as shown in FIG. 1, and in the other sensor, the MEMS chip 1 and the ASIC chip 2 are symmetrically arranged, as shown in FIG. 2.

Figure 1:
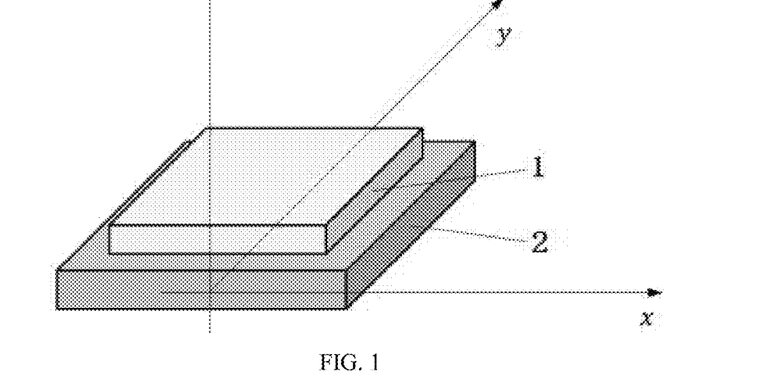
FIG. 1 is a schematic diagram of stacking an MEMS chip and an ASIC chip according to one embodiment of the present disclosure.

A stacking scheme is shown in FIG. 1. The MEMS chip 1 and the ASIC chip 2 are stacked up and down in a thickness direction, the ASIC chip 2 is fixed on the substrate (not shown in the figure), and the MEMS chip 1 is stacked on a top of the ASCI chip 2. The MEMS chip 1 and the ASIC chip 2 are attached through gluing or bonding. When the MEMS chip 1 and the ASIC chip 2 are attached through gluing, a thickness of adhesive is less than or equal to 0.5 μm, so that the MEMS chip 1 and the ASIC chip 2 have highly consistent stress concentration characteristics. Alternatively, the MEMS chip 1 may be coaxially stacked with the ASIC chip 2, so that the MEMS chip 1 and the ASIC chip 2 have the highly consistent stress concentration characteristics. The ASIC chip 2 is fixed on the substrate 3 through gluing or bonding.

Figure 2:
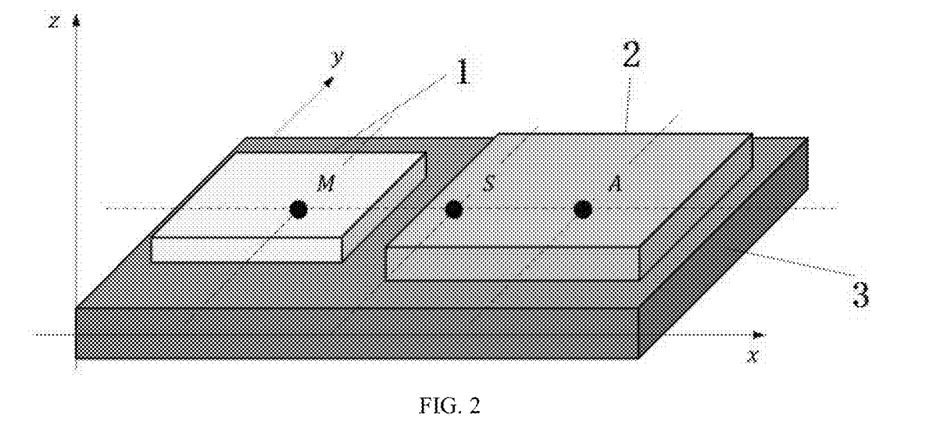
FIG. 2 is a schematic diagram of symmetrically arranging an MEMS chip and an ASIC chip according to one embodiment of the present disclosure.

A symmetrical arrangement scheme is shown in FIG. 2. A center of a lower left edge of the substrate 3 is defined as a coordinate origin, a middle major axis of a front side is defined as an x-axis, and a middle major axis of a left side is used as a y-axis. Both the MEMS chip 1 and the ASIC chip 2 are fixed on the substrate 3, and the center point of the MEMS chip 1, the center point of the ASIC chip 2 and the center point of the substrate 3 are on a plane parallel to the front side of the substrate 3. The distance from the center point M of the MEMS chip 1 to an intermediate plane of the substrate 3 is equal to the distance from the center point A of the ASIC chip 2 to the intermediate plane of the substrate 3. The intermediate plane is parallel to the left side and a right side of the substrate 3. For the substrate 3, the left side is parallel to the right side, the front side is parallel to a rear side, the left side is perpendicular to the front side, a top surface is parallel to a bottom surface, and the top surface is perpendicular to both the front side and the left side. The MEMS chip 1 and the ASIC chip 2 are fixed on the substrate 3 in the same way, for example, may be fixed through gluing or bonding. When the MEMS chip 1 and the ASIC chip 2 are fixed through gluing, an adhesive thickness of the MEMS chip 1 is consistent with an adhesive thickness of the ASIC chip 2.

Figure 3:
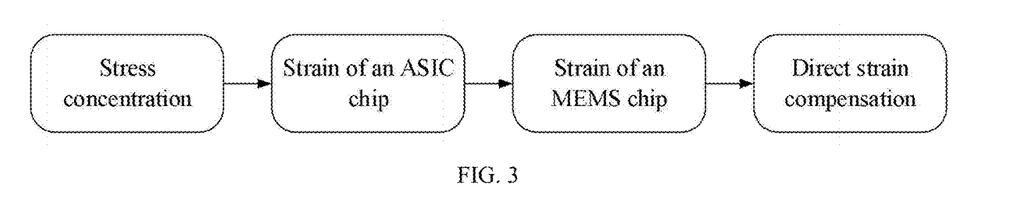
FIG. 3 shows a stress calibration process according to one embodiment of the present disclosure.

Stress calibration processing of the two sensors in the embodiment is shown in FIG. 3. A structure of the ASIC chip 2 is designed, such that the ASIC chip can measure stress, and an arrangement manner of the MEMS chip 1 and the ASIC chip 2 is designed to ensure that the MEMS chip 1 and the ASIC chip 2 have highly consistent stress concentration characteristics. Assuming that a z-axis component of resultant force obtained after thermal stress and mechanical stress act on the ASIC chip 2 is $F_{a\_z}$, a z-axis component of resultant force on the MEMS chip 1 is $F_{m\_z}$, and there is a following relationship between the two z-axis components:

$$F_{m\_z}=f(F_{a\_z})=kF_{a\_z}+b$$

In the stacking scheme, k approaches 1 and b approaches 0. In the symmetrical arrangement scheme, k is related to an area ratio of the two chips, and b is a correction coefficient.

If an external capacitor $C_{ext}$ needs to be measured, it is only required to enable the to-be-measured external capacitor $C_{ext}$ and reference resistor $R_{ref}$ inside the RC circuit to form an external discharge circuit. A value of the external capacitor $C_{ext}$ can be measured by comparing discharge time of the external discharge circuit formed by the to-be-measured external capacitor and the reference resistor inside the RC circuit with discharge time of an internal discharge circuit formed by reference capacitor $C_{ref}$ and the reference resistor $R_{ref}$ inside the RC circuit:

$$\frac{\tau_{ext}}{\tau_{ref}} = \frac{1/R_{ref} \times C_{ext}}{1/R_{ref} \times C_{ref}} = \frac{C_{ref}}{C_{ext}}$$

In the above formula, $\tau_{ext}$ represents the discharge time of the external discharge circuit, $\tau_{ref}$ represents the discharge time of the internal discharge circuit, $C_{ref}$ represents the reference capacitor inside the RC circuit, and $C_{ext}$ represents the to-be-measured external capacitor.

Similarly, electrical signals such as a voltage, a current, and inductance can also be converted into resistance or capacitance for measurement. The solution in the specific implementations can achieve high dynamics and precision. Actual measurement shows that the precision can reach at most 22 significant bits.

For MEMS devices that heavily rely on a size of a silicon micromechanical structure, such as inertial devices like an accelerometer, a magnetometer, and a gyroscope, this solution can greatly improve accuracy and temperature stability of the MEMS devices, and can also greatly reduce costs of packaging and calibration. For MEMS devices that rely relatively on the size of the silicon micromechanical structure, such as a pneumatic device, this solution can greatly reduce a quantity of calibration points with same accuracy, thereby significantly reducing the calibration cost. Experiments have shown that this solution can reduce an impact of a temperature drift by more than 90%, or lower the calibration cost by 50-70% (for the inertial MEMS devices) and 30-50% (for non-inertial MEMS devices) with the same accuracy and temperature stability.

Figure 11:
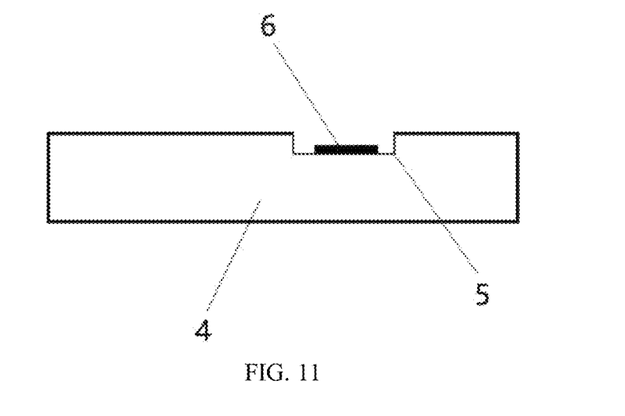
FIG. 11 is a schematic diagram of an output shaft of an electric toothbrush with a rectangular groove according to one embodiment of the present disclosure.
Figure 12:
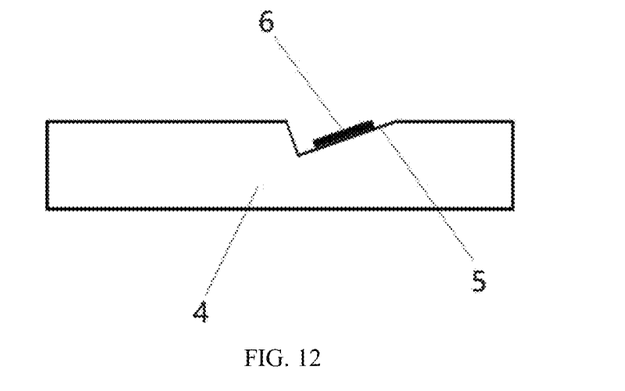
FIG. 12 is a schematic diagram of an output shaft of an electric toothbrush with a triangular groove according to one embodiment of the present disclosure.
Figure 13:
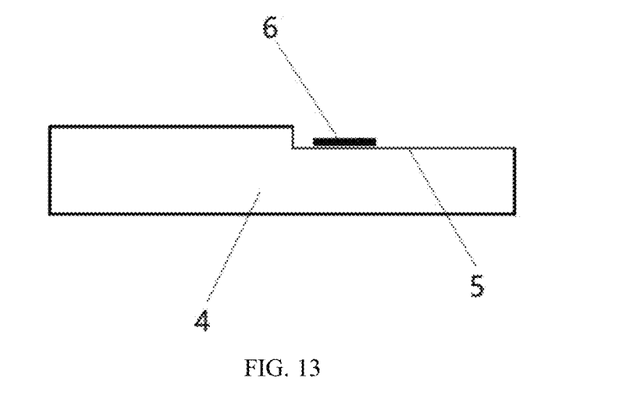
FIG. 13 is a schematic diagram of an output shaft of an electric toothbrush with an L-shaped groove according to one embodiment of the present disclosure.

In addition, the embodiments further provide an electric toothbrush using an ASIC chip. As shown in FIG. 11 to FIG. 13, the electric toothbrush includes a brush handle and a brush head (not shown in the figure). A driving component is disposed in the brush handle, and output shaft 4 of the driving component is connected to the brush head. The electric toothbrush further includes ASIC chip 6 in the specific implementations. The ASIC chip 6 is disposed on the output shaft 4, the output shaft 4 is further provided with a stress triggering component, and the ASIC chip 6 is configured to detect stress at a position of the stress triggering component. Specifically, the stress triggering component may be groove 5, and the ASIC chip 6 is located within the groove 5. The groove 5 has any one of a rectangular cross section, a triangular cross section, and an L-shaped cross section, as shown in FIG. 11 to FIG. 13.

The electric toothbrush in the specific implementations adopts a self-designed ASIC chip instead of a Wheatstone bridge whose resistance is easily to be affected by overflow of welding adhesive, and therefore effectively improves stability, reliability, sensitivity, and linearity of stress detection. In addition, since the ASIC chip itself can achieve analog-to-digital conversion without a need for an additional analog-to-digital conversion circuit, the entire ASIC chip is located in a single temperature field, and can more accurately compensate for the temperature drift.

What is claimed is:

1. An application specific integrated circuit (ASIC) chip, comprising:
a delay chain array, a resistor-capacitor (RC) circuit, and a microprocessor, wherein the microprocessor outputs a trigger signal to the RC circuit, the RC circuit outputs a first signal START and a second signal STOP to an input port of the delay chain array, the delay chain array outputs a time propagation signal to the microprocessor, and the microprocessor processes the time propagation signal to output a digital signal; and
the delay chain array comprises a plurality of delay chains, wherein inside the ASIC chip, a "four-corner+middle" delay chain combination is arranged on at least one plane parallel to one side of the ASIC chip, a "four-corner+middle" delay chain combination is arranged on at least one plane parallel to the other side of the ASIC chip, and a "four-corner+middle" delay chain combination is arranged on at least one plane parallel to a bottom surface of the ASIC chip; the two sides of the ASIC chip are perpendicular to each other; and the "four-corner+middle" delay chain combination comprises delay chains disposed at four corners of a plane and a delay chain disposed at a center of the plane, wherein the delay chain disposed at the center of the plane is located in another plane that intersects with the plane at a certain angle.

2. The ASIC chip according to claim 1, wherein the delay chains at the four corners of the plane each are any one of a 90° delay chain, a cross-shaped delay chain, and a square delay chain, and the delay chain at the center of the plane is any one of the 90° delay chain, the cross-shaped delay chain, the square delay chain, and a concircularly distributed delay chain;

the 90° delay chain comprises two 90°-arranged delay chain units;

the cross-shaped delay chain comprises four delay chain units that form four branches of a "cross-shaped" structure, wherein each of the four delay chain units is located on one branch of the "cross-shaped" structure, and the delay chains are perpendicular to the next ones clock or counter-clock wise;

the square delay chain comprises four delay chain units that form four sides of a "square" structure, wherein each of the four delay chain units is located on one side of the "square" structure, and the delay chains are perpendicular to the next ones clock or counter-clock wise; and the concircularly distributed delay chain comprises a plurality of delay chain units arranged on an arc, with two adjacent ones of the plurality of delay chain units arranged at a certain angle.

3. The ASIC chip according to claim 2, wherein the delay chain unit is any one of a cursor delay chain unit, a tap delay chain unit, and a differential delay chain unit.

4. A sensor using an ASIC chip, comprising a substrate and a micro-electromechanical system (MEMS) chip, wherein the sensor further comprises the ASIC chip according to claim 1, the ASIC chip is fixed on the substrate, and the MEMS chip is stacked on a top of the ASIC chip.

5. The sensor using the ASIC chip according to claim 4, wherein the MEMS chip and the ASIC chip are attached through gluing or bonding; and when the MEMS chip and the ASIC chip are attached through gluing, a thickness of adhesive is less than or equal to 0.5 μm.

6. The sensor using the ASIC chip according to claim 4, wherein the MEMS chip is coaxially stacked with the ASIC chip.

7. A sensor using an ASIC chip, comprising a substrate and an MEMS chip, wherein the sensor further comprises the ASIC chip according to claim 1, both the MEMS chip and the ASIC chip are fixed on the substrate, the center point of the MEMS chip, a center point of the ASIC chip and a center point of the substrate are on a plane parallel to one side of the substrate, a distance from the center point of the MEMS chip to an intermediate plane of the substrate is equal to a distance from the center point of the ASIC chip to the intermediate plane of the substrate, the intermediate plane is an intermediate plane parallel to the other side of the substrate, and the two sides of the substrate are perpendicular to each other.

8. The sensor using the ASIC chip according to claim 7, wherein both the MEMS chip and the ASIC chip are fixed on the substrate through gluing or bonding; and when the MEMS chip and the ASIC chip are fixed on the substrate through gluing, an adhesive thickness of the MEMS chip is consistent with an adhesive thickness of the ASIC chip.

9. An electric toothbrush using an ASIC chip, comprising a brush handle and a brush head, wherein a driving component is disposed in the brush handle, and an output shaft of the driving component is connected to the brush head; and the electric toothbrush further comprises the ASIC chip according to claim 1, the ASIC chip is disposed on the output shaft, the output shaft is further provided with a stress triggering component, and the ASIC chip is configured to detect stress at a position of the stress triggering component.

10. The electric toothbrush using the ASIC chip according to claim 9, wherein the stress triggering component is a groove disposed on a surface of the output shaft, and the ASIC chip is disposed inside the groove.

11. The electric toothbrush using the ASIC chip according to claim 10, wherein the groove has any one of a rectangular cross section, a triangular cross section, and an L-shaped cross section.

12. The sensor using the ASIC chip according to claim 4, wherein in the ASIC chip, the delay chains at the four corners of the plane each are any one of a 90° delay chain, a cross-shaped delay chain, and a square delay chain, and the delay chain at the center of the plane is any one of the 90° delay chain, the cross-shaped delay chain, the square delay chain, and a concircularly distributed delay chain;
the 90° delay chain comprises two 90°-arranged delay chain units;
the cross-shaped delay chain comprises four delay chain units that form four branches of a "cross-shaped" structure, wherein each of the four delay chain units is located on one branch of the "cross-shaped" structure, and the delay chains are perpendicular to the next ones clock or counter-clock wise;
the square delay chain comprises four delay chain units that form four sides of a "square" structure, wherein each of the four delay chain units is located on one side of the "square" structure, and the delay chains are perpendicular to the next ones clock or counter-clock wise; and
the concircularly distributed delay chain comprises a plurality of delay chain units arranged on an arc, with two adjacent ones of the plurality of delay chain units arranged at a certain angle.

13. The sensor using the ASIC chip according to claim 12, wherein in the ASIC chip, the delay chain unit is any one of a cursor delay chain unit, a tap delay chain unit, and a differential delay chain unit.

14. The sensor using the ASIC chip according to claim 7, wherein in the ASIC chip, the delay chains at the four corners of the plane each are any one of a 90° delay chain, a cross-shaped delay chain, and a square delay chain, and the delay chain at the center of the plane is any one of the 90° delay chain, the cross-shaped delay chain, the square delay chain, and a concircularly distributed delay chain;
the 90° delay chain comprises two 90°-arranged delay chain units;
the cross-shaped delay chain comprises four delay chain units that form four branches of a "cross-shaped" structure, wherein each of the four delay chain units is located on one branch of the "cross-shaped" structure, and the delay chains are perpendicular to the next ones clock or counter-clock wise;
the square delay chain comprises four delay chain units that form four sides of a "square" structure, wherein each of the four delay chain units is located on one side of the "square" structure, and the delay chains are perpendicular to the next ones clock or counter-clock wise; and
the concircularly distributed delay chain comprises a plurality of delay chain units arranged on an arc, with two adjacent ones of the plurality of delay chain units arranged at a certain angle.

15. The sensor using the ASIC chip according to claim 14, wherein in the ASIC chip, the delay chain unit is any one of a cursor delay chain unit, a tap delay chain unit, and a differential delay chain unit.

16. The electric toothbrush using the ASIC chip according to claim 9, wherein in the ASIC chip, the delay chains at the four corners of the plane each are any one of a 90° delay chain, a cross-shaped delay chain, and a square delay chain, and the delay chain at the center of the plane is any one of the 90° delay chain, the cross-shaped delay chain, the square delay chain, and a concircularly distributed delay chain;
the 90° delay chain comprises two 90°-arranged delay chain units;
the cross-shaped delay chain comprises four delay chain units that form four branches of a "cross-shaped" structure, wherein each of the four delay chain units is located on one branch of the "cross-shaped" structure, and the delay chains are perpendicular to the next ones clock or counter-clock wise;
the square delay chain comprises four delay chain units that form four sides of a "square" structure, wherein each of the four delay chain units is located on one side of the "square" structure, and the delay chains are perpendicular to the next ones clock or counter-clock wise; and
the concircularly distributed delay chain comprises a plurality of delay chain units arranged on an arc, with two adjacent ones of the plurality of delay chain units arranged at a certain angle.

17. The electric toothbrush using the ASIC chip according to claim 16, wherein in the ASIC chip, the delay chain unit is any one of a cursor delay chain unit, a tap delay chain unit, and a differential delay chain unit.

\* \* \* \* \*